United States Patent [19]

Cordts et al.

[11] 4,148,854

[45] Apr. 10, 1979

[54] MATCHED DIE MOLDING OF FIBER REINFORCED PLASTIC ARTICLES

[75] Inventors: Howard P. Cordts, Grafton; Eugene J. Grandlic, Sheboygan, both of Wis.

[73] Assignee: Freeman Chemical Corporation, Port Washington, Wis.

[21] Appl. No.: 681,727

[22] Filed: Apr. 29, 1976

[51] Int. Cl.² .................................... B29D 27/00
[52] U.S. Cl. ........................ 264/45.3; 260/144; 264/46.7; 264/55; 264/258; 264/DIG. 5; 521/122; 521/128; 521/138
[58] Field of Search .............. 264/45.2, 45.3, 55, 264/46.6, DIG. 53, DIG. 17, DIG. 5, 46.7; 260/2.5 N, 144; 521/122, 128, 138

[56] References Cited

U.S. PATENT DOCUMENTS

| | | | |
|---|---|---|---|
| 1,515,475 | 11/1924 | Goodwin | 264/55 X |
| 2,159,213 | 5/1939 | Howard | 264/45.3 X |
| 2,194,036 | 3/1940 | Talalay | 264/45.3 |
| 2,524,039 | 10/1950 | Carpentier | 264/55 |
| 2,751,626 | 6/1956 | Lyijynen | 264/DIG. 53 |
| 2,763,897 | 9/1956 | Gates et al. | 264/55 |
| 2,769,205 | 11/1956 | Pfleumer | 264/55 |
| 3,818,086 | 6/1974 | Stastny et al. | 264/55 |
| 3,823,099 | 7/1974 | Doyle | 260/2.5 N X |
| 3,856,902 | 12/1974 | Kirkpatrick | 264/55 X |
| 3,867,494 | 2/1975 | Rood et al. | 264/45.3 |
| 3,954,274 | 5/1976 | Grandlic, et al. | 264/46.6 X |
| 3,993,609 | 11/1976 | Kamens et al. | 260/2.5 N |

FOREIGN PATENT DOCUMENTS 924299  4/1973  Canada .................................. 260/144

*Primary Examiner*—Philip Anderson
*Attorney, Agent, or Firm*—Harry B. Keck; George E. Manias

[57] ABSTRACT

Lightweight glass fiber reinforced plastic articles are produced in matched dies by combining fibrous reinforcing materials, such as glass fibers, with a foamable unsaturated polyester resin composition. The matched dies are closed and compressed so that the resin composition fills the mold cavity and wets the fibrous reinforcing material. Thereafter the matched dies are separated to increase the volume of the mold cavity by at least 50 percent greater than the closed volume. The matched dies are retained in this relationship until the unsaturated polyester resin composition has cured and expanded to fill the mold cavity. The resulting product has a density less than 67 percent of the density of a corresponding reinforced plastic article fabricated from the same composition (unsaturated polyester resin, fillers and reinforcement), which is not foamed. The unsaturated polyester resin composition preferably includes 0.5 to 3 percent by weight (based on the weight of unsaturated polyester resin) of an azo blowing agent to accomplish resin cure and foaming.

The resulting products exhibit energy absorption characteristics when compared with other fiber reinforced plastic products, compared on a strength-to-weight basis.

5 Claims, 4 Drawing Figures

MATCHED DIE MOLDING OF FIBER REINFORCED PLASTIC ARTICLES

BACKGROUND OF THE INVENTION

1. Field of the Invention

The invention relates to fiber reinforced foamed plastic products employing unsaturated polyester resins in matched dies.

2. Description of the Prior Art

Fiber reinforced plastic articles employing unsaturated polyester resin compositions have been fabricated in matched dies for many years. Some of the products which have been fabricated in this fashion include automotive parts such as fenders, corner moldings, ducting, electrical parts such as switch gear housings, and the like. The products have been fabricated in relatively expensive matched metal dies maintained under substantial pressures during the cure. Low pressure matched die molding also is known. The cavity molding of foamable resins such as polyurethane foam resins in combination with reinforcing fibers also is known.

Foamable unsaturated polyester resin compositions containing azo blowing agents are known. See U.S. Pat. application Ser. No. 516,821, 21, filed Oct. 21, 1974, and now U.S. Pat. No. 3,954,274 assigned to the assignee of this invention. The use of such foamable unsaturated polyester resin compositions containing azo blowing agents in spray-up fiber reinforced plastic products is known. See U.S. Pat. application Ser. No. 584,608, filed June 6, 1975 and now abandoned, assigned to the assignee of this invention.

When unsaturated polyester resins are employed in matched die molding processes, there are two customary procedures available. In the first procedures, the polyester resin and glass fibers are combined into a product known as a bulk molding compound or a sheet molding compound which also contains a high temperature polymerization initiator for the curing of the resin ingredient. The mixture of fibers and resin along with other particulate inert fillers if desired is placed in a mold cavity between matched dies; the dies are brought together in compression and are heated to activate the high temperature polymerization initiator. The other procedure, known as a wet molding process, involves lining a mold cavity with fibrous reinforcement, sometimes randomly and sometimes precut and/or preshaped as a molding preform. Liquid unsaturated polyester resin along with a high temperature initiator is poured on top of the reinforcing fibers and the mold is closed so that the wet polyester resin fills the mold cavity and wets the reinforcing fibers. The mold cavity is retained in its closed position until the polyester resin has cured.

SUMMARY OF THE INVENTION

According to the present invention fiber reinforced lightweight foamed unsaturated polyester resin products having remarkable strength characteristics and relatively light weight can be fabricated to close dimensional tolerances in matched dies by employing azo blowing agents which serve not only as the foaming agent but also as the curing catalyst for the resin. One of the shortcomings of the azo blowing agents is that very rapid curing and accompanying foaming of the unsaturated polyester resin occurs immediately upon mixing of the azo blowing agent with the resin. The two ingredients must be intimately mixed so that the azo blowing agent is homogeneously dispersed throughout the resin composition.

The present invention constitutes a variation of the second described process for producing fiber reinforced polyester products. According to the present invention a mold cavity is supplied with reinforcing fibers in the form of randomly dispersed fibers or a preformed mat. Thereupon a freshly prepared mixture of unsaturated polyester resin and an azo blowing agent is introduced into the mold cavity. The mold cavity is rapidly fully closed under pressure until the resin and fibers substantially entirely fill the closed mold cavity whereby the fibers are thoroughly wetted with the resin composition. Thereupon the mold cavity is opened until the volume of the mold cavity is at least 50 percent greater than the fully closed volume. The mold cavity is maintained in this expanded position until the unsaturated polyester resin composition has cured and has foamed to fill the expanded volume. Thereafter a cured, fiber reinforced product is withdrawn from the mold having a density less than 67 percent of the density of a conventional fiber reinforced polyester article produced by matched die molding processes with the same composition, i.e., the same unsaturated polyester resin, fillers and reinforcement.

The mold cavity may be increased in volume by as much as 300 percent, based upon the volume when closed and completely filled with the molding composition. This results in a product having a density from 0.25 to 0.67 times the density of the corresponding article prepared in accordance with prior art practices from the same composition, i.e., the same unsaturated polyester resin, fillers and reinforcement.

BRIEF DESCRIPTION OF THE DRAWINGS

The mold is shown in FIG. 1 to be closed and empty; in FIG. 2 to be open and charged with moldable material; in FIG. 3 to be fully closed; in FIG. 4 to be partially expanded from the fully closed position of FIG. 4.

DESCRIPTION OF THE PREFERRED EMBODIMENT(S)

Figure 1:
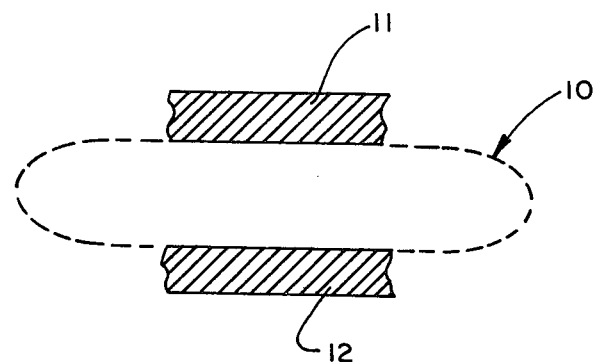
FIGS. 1, 2, 3 and 4 are schematic cross-section illustrations of a mold in which the process of the present invention may be carried out.
Figure 2:
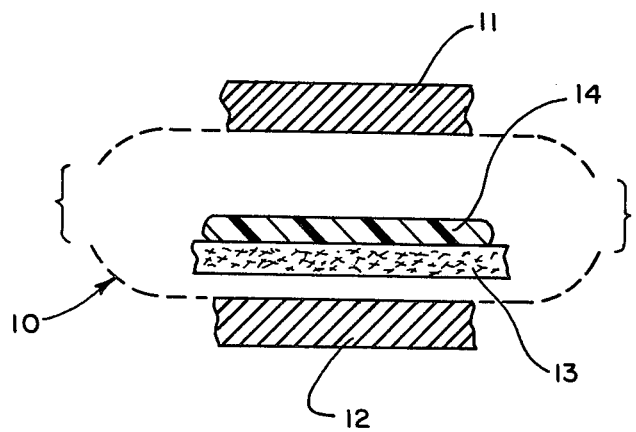

Unsaturated Polyester Resins—Unsaturated polyester resins are well known in the plastics arts. In general they comprise the reaction product of polyhydric alcohol and polycarboxylic acid or anhydride, at least a portion of which is ethylenically unsaturated polycarboxylic acid or anhydride. The polyols customarily are diols although some higher polyols such as triols, tetrols and pentols can be employed. Typical polyols in unsaturated polyester resins include ethylene glycol, diethylene glycol, polyethylene glycol, propylene glycol, dipropylene glycol, polypropylene glycol, butyl glycol, isobutyl glycol, neopentyl glycol, dihydroxy pentane, trimethylol pentane, pentaerythritol and the like. The polycarboxylic acid or anhydride customarily is a dicarboxylic acid or anhydride such as phthalic acid, phthalic anhydride, isophthalic acid, orthophthalic acid, terephthalic acid, succinic acid, glutaric acid, maleic acid, fumaric acid, itaconic acid, citraconic acid, endomethylene tetrahydrophthalic acid, chlorinated or brominated dibasic acids and the like. Customarily the unsaturated polyester resin has an acid value in the range of 5 to 50. The unsaturated polyester resin normally is dissolved in a copolymerizable monomer such as styrene, alpha methyl styrene, orthochlorostyrene, divinyl benzene, vinyl toluene, acrylic acid, methacrylic acid, acrylic and methacrylic esters, and the like. The monomer constitutes from about 15 to 40 parts by weight based upon 85 to 60 parts by weight of the unsaturated polyester resin. The mixture of unsaturated polyester resin and copolymerizable monomer is frequently referred to as an unsaturated polyester resin syrup.

Fibrous Reinforcement—The unsaturated polyester resin syrups frequently are combined with fibrous reinforcement material, customarily glass fibers in the form of chopped glass roving or preformed glass fiber mats. The amount of glass fibers in a glass fiber reinforced article ranges from about 5 to about 25 percent of the weight of the article. Customarily the glass fibers are pretreated with a sizing agent to improve the bond with the cured unsaturated polyester resin syrup.

Other Additives—It is not uncommon to include inert particulate fillers in fiber reinforced unsaturated polyester resin articles. Such inert fillers might include ground glass, silica, calcium carbonate, wood flour, hydrated alumina, dolomite, magnesia, fire retardants such as antimony oxides, and the like. Inert fillers may be added up to about 100 parts by weight, based upon 100 parts by weight of the unsaturated polyester resin syrup. The unsaturated polyester resin syrup also may include other additives such as pigments, dyes, mold release agents, polymerization inhibitors, surfactants, initiators and promoters.

Combined Blowing Agent and Catalyst—It is an essential feature of the present invention that the unsaturated polyester resin syrup will contain 0.5 to 3.0 parts by weight based upon 100 parts by weight of the unsaturated polyester resin syrup of an azo blowing agent. The azo blowing agent preferably has the following structural formula:

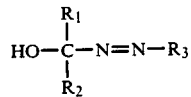

wherein $R_1$ and $R_2$ are lower alkyl groups having from 1 to 4 carbon atoms and $R_3$ is a tertiary alkyl group having 4 to 8 carbon atoms or an aromatic substituted tertiary alkyl group having 9 to 12 carbon atoms. Examples of the $R_3$ substituent are the tertiary butyl radical and the alpha cumyl radical. A preferred alpha hydroxy azo blowing agent is identified as blowing agent I having the following formula:

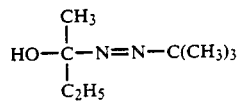

The azo blowing agent may be employed full strength or it may be diluted with inert solvents which will not impede the polymerization of the polyester resin syrup. Suitable solvents include mineral oil, styrene or ethyl acetate, for example.

Preferably the composition also will contain a small quantity of a peroxy polymerization catalyst to complete the resin cure since the azo blowing agent alone is unable to accomplish a complete cure in this environment. 0.2 to 2.0 parts by weight of the peroxy catalyst, based on 100 parts by weight of unsaturated polyester resin is acceptable. Tert-butyl perbenzoate is a preferred catalyst.

Accelerators—While copper salts may be employed as cure accelerators in the present compositions, their use is not preferred. Copper salts accelerate the cure of the composition but also abbreviate the pot-life of the composition, i.e., the amount of time within which the composition must be used after mixing. The pot-life of the composition (containing the azo blowing agent and resin) is about five minutes in the absence of copper salt accelerators but is reduced to about one minute when copper salt accelerators are employed.

Curing Temperatures—Elevated molding temperatures are contemplated to achieve the combined foaming and resin curing. Temperatures from 220° F. to 320° F. are preferred, with the precise temperature being selected according to the resin viscosity and the identity and amount of catalyst in the composition.

A typical mold is illustrated in FIG. 1 having a mold cavity 10 defined by mold elements 11, 12. The inner surfaces of the mold elements 11, 12 define the mold cavity 10.

Figure 3:
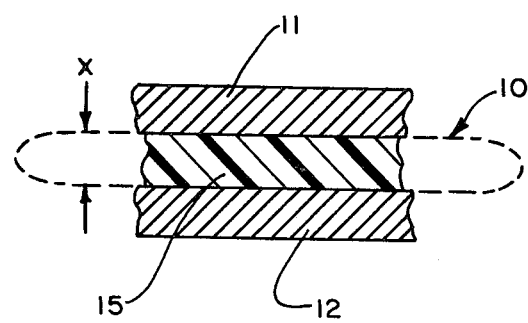

When the mold elements 11, 12 are separated, it is possible to introduce into the mold cavity glass fibrous reinforcement 13 and unpolymerized unsaturated polyester resin syrup 14. Thereafter the mold is closed by moving the mold elements 11, 12 together as shown in FIG. 3 so that the mold cavity has a volume which can be related to the surface-to-surface spacing X illustrated in FIG. 3. As shown in FIG. 3, the glass fiber reinforcement and unsaturated polyester resin have been combined 15 to fill entirely the closed mold cavity 10. In this compacted condition, the unsaturated polyester resin wets out the glass fiber reinforcement and migrates into engagement with all of the inner surfaces of the mold elements 11, 12.

According to the present invention, the filled mold cavity 10 thereafter is increased in volume by at least 1.5 times. This is indicated schematically in FIG. 4 by showing that the mold elements 11, 12 are moved apart by a distance which is at least 1.5 times the separation distance X of the fully closed position of FIG. 3. It should be noted in FIG. 4 that the increased volume of the mold cavity 10 is accomplished without opening the mold cavity.

Figure 4:
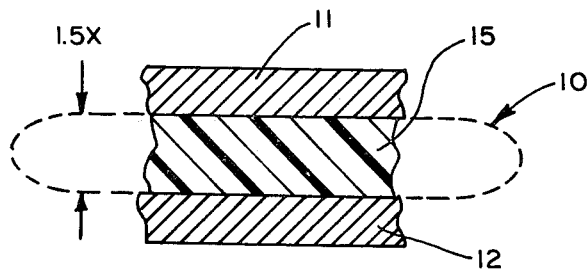

As the unsaturated polyester resin foams in FIG. 4, the entire mold cavity 10 becomes filled.

EXAMPLE 1

An unsaturated polyester resin syrup identified as Resin I was prepared by reacting 105 mols of propylene glycol with 50 mols isophthalic acid and 50 mols maleic anhydride. 67 parts by weight of the resulting polyester resin was combined with 33 parts by weight styrene along with small quantities of toluhydroquinone as inhibitor and hydroquinone as inhibitor. Resin I has an acid value ranging from 17 to 25.

EXAMPLE 2

An unsaturated polyester resin syrup identified as Resin II is prepared by reacting 5 mols trimethylol ethane and 111 mols propylene glycol with 25 mols isophthalic acid and 75 mols maleic anhydride. 73 parts by weight of the resulting resin is combined with 27 parts by weight styrene along with minor quantities of hydroquinone and toluhydroquinone as inhibitors. Resin II has an acid value of 15 to 20.

EXAMPLE 3

A molding composition was prepared by combining 37.24 parts by weight of the Resin I with 21.74 parts by weight of a styrene solution containing 35 parts by weight polystyrene dispersed in 65 parts by weight monomeric styrene;

1.68 parts by weight zinc stearate;

37.24 parts by weight powdered calcium carbonate;

0.6 parts by weight tertiary butyl perbenzoate.

To this mixture was added 0.89 parts by weight of a surfactant and 0.6 parts by weight of the blowing agent I. The total composition included 100 parts by weight.

The materials were mixed for 15 seconds in a paper cup with a high shear mixer and were poured on top of two layers of glass continuous strand fiber mat, 1.5 ounces per square foot having an uncompressed thickness from 0.7 to 1.0 inches. The two wetted glass fiber mats were covered with a third glass fiber mat and the three glass fiber mat layers and resin mixture were pressed at 300° F. in a closed mold at about 2-3 tons per square foot pressure. The mold was closed for 1 second and thereafter immediately partially opened and held in the open position for about 8 minutes. The closed mold cavity had a thickness of 0.1 inch. The mold cavity in the partially open position had a thickness of about 0.28 inch, i.e., the press was opened by about 3/16 inch from its fully closed position wherein 0.1 inch thick metal stops established the closed thickness. The resulting product was a rigid glass fiber reinforced panel having a final thickness of about 0.26 inch; a measured density of 64 pounds per cubic foot. The glass content in the resulting product was 17 to 19 percent by weight (different samples showed slightly different glass contents).

The articles had the following properties:
flexural strength; 8,900 psi
flexural modulus; 711,000
tensile strength; 2,700 psi
tensile modulus; 407,000
percent elongation; 0.99%

EXAMPLE 4

A molding composition was prepared by combining 53.65 parts by weight of Resin II with 31.33 parts by weight of a mixture containing 35 parts by weight polystyrene in 65 parts by weight monomeric styrene;

1.61 parts by weight zinc stearate;

10.73 parts by weight tertiary butyl perbenzoate;

0.91 parts by weight surfactant;

0.91 parts by weight blowing agent I.

The procedure employed in Example 3 was duplicated, that is, two layers of continuous strand glass fiber mat were placed in a bottom mold and the described composition was poured on top of the two glass fiber mats. Thereafter a third glass fiber mat was applied on top of the resin mixture and the mold was closed to 0.1 inch as in Example 3 at 300° F. for approximately 1 second. The mold was partially opened by approximately 3/16 inch as in Example 3 to allow the composition to expand and the composition was retained in the mold for about 3 minutes. A rigid cured product was removed from the mold. The product had a density of 55 pounds per cubic foot and contained 28 to 30 percent by weight glass fibers. The article was 0.295 inch thick.

The article had the following properties:
flexural strength; 7,350 psi
flexural modulus; 452,000
tensile strength; 6,700 psi
tensile modulus; 443,000
percent elongation; 1.61%

EXAMPLE 5

A number of glass fiber reinforced laminates were prepared for comparison as follows:

A. Resin mixtures as described in U.S. Pat. No. 3,621,093 employing the reservoir molding procedure described in U.S. Pat. No. 3,915,783.

B. Vinyl-ester terminated polyesters described in Preprints of 25th Technical Conf. 1970, Reinforced Plastics/Composites Division, The Society of the Plastics Industry, Inc., Section 4-B, Pages 1, 2, employing the reservoir molding procedure described in U.S. Pat. No. 3,915,783.

C. Epoxy resins as described in U.S. Pat. No. 3,915,783 employing the reservoir molding procedure described in U.S. Pat. No. 3,915,783.

D. Resin mixtures as described in U.S. Pat. No. 3,621,093 employing conventional molding techniques, i.e., no deliberate density reduction.

E. Conventional polyester resin mixtures in a sheet molding compound.

F. Conventional polyester resin mixtures with random glass fiber reinforcement, no deliberate density reduction.

G. The present product produced as described in Example 4.

The comparative properties of the laminates are set forth in the following Table I.

TABLE I

| LAMINATE | A | B | C | D | E | F | G |
|---|---|---|---|---|---|---|---|
| Thickness (inch) | 0.135 | 0.151 | 0.134 | 0.135 | 0.150 | 0.136 | 0.250 |
| Density | 1.20 | 1.18 | 1.297 | 1.15 | 2.02 | 1.305 | 0.88 |
| Tensile strength, p.s.i. | 5,640 | 7,913 | 6,693 | 3,411 | 10,978 | 7,829 | 6,711 |
| Flexural strength, p.s.i. | 15,880 | 18,969 | 19,634 | 11,095 | 21,764 | 19,050 | 7,356 |
| Falling ball impact height, inches | 24 | 26 | 14 | 18 | 14 | 12 | 36 |

The falling ball impact test is carried out by dropping a steel ball weighing 2.31 pounds onto a clamped area of 6 inches diameter of the laminate. The test result is the minimum height of fall which will create a visible surface interruption on the undersurface of the laminate.

The remarkably high value of this test for the present laminate G indicates that the product has useful impact resistant properties. The tensile and flexural strength of the present laminate also are acceptable for many of the end-use applications described herein.

We claim:

1. A method for producing foamed lightweight, glass fiber reinforced molded articles from unsaturated polyester resin compositions comprising:

(1) introducing glass fibrous reinforcing material into one element of a mold;

(2) introducing into the mold an unsaturated polyester resin syrup composition containing (a) 0.5 to 3 percent by weight (based on the weight of unsaturated polyester resin) of an alpha hydroxy azo blowing agent and (b) a polymerization initiator;

(3) closing the mold until the said resin composition fills the entire mold cavity and wets the said glass fibrous reinforcing material;

(4) thereafter partially opening the mold to increase the volume of the mold cavity by at least 50 percent greater than the volume of the said mold cavity in step (3);

(5) retaining the mold as in step (4) until the said resin composition has foamed and cured;

(6) opening the mold and withdrawing a foamed and cured reinforced plastic article.

2. The method of claim 1 wherein the said azo blowing agent has the following formula:

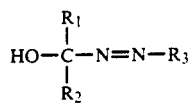

wherein $R_1$ and $R_2$ are lower alkyl groups having from 1 to 4 carbon atoms and $R_3$ is a tertiary alkyl group having 4 to 8 carbon atoms or an aromatic substituted tertiary alkyl group having 9 to 12 carbon atoms.

3. The method of claim 2 wherein the said azo blowing agent is

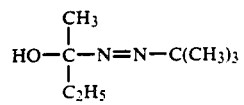

4. The method of claim 1 wherein the acid value of the said unsaturated polyester resin is from 5 to 50.

5. The method of claim 1 wherein the said glass fibrous reinforcing material comprises from 5 to 25 percent of the total weight of the resulting article.

* * * * *